T. LENNOX.
DEVICE FOR APPLYING LIQUID INSECTICIDES TO ANIMALS.
APPLICATION FILED APR. 23, 1915.
1,211,187.
Patented Jan. 2, 1917.
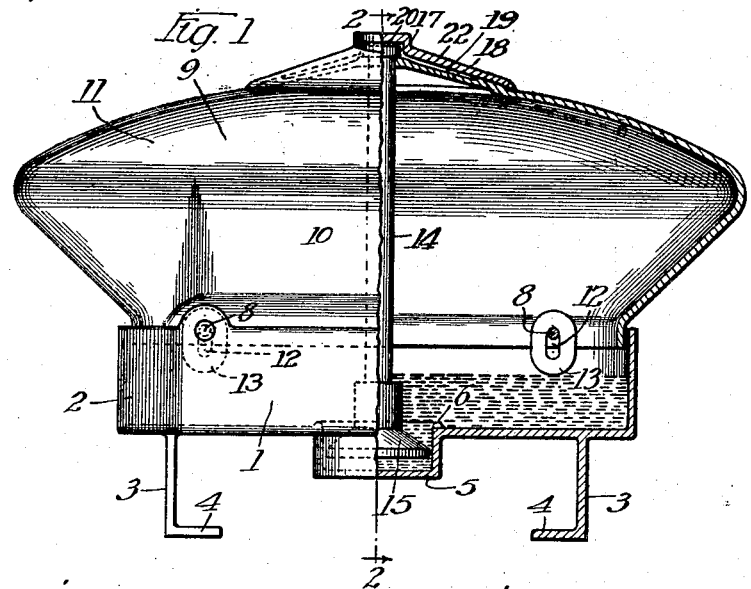
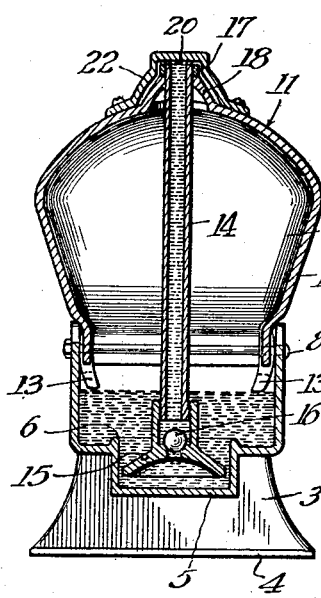
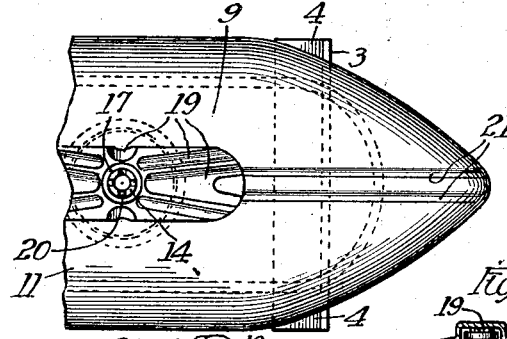
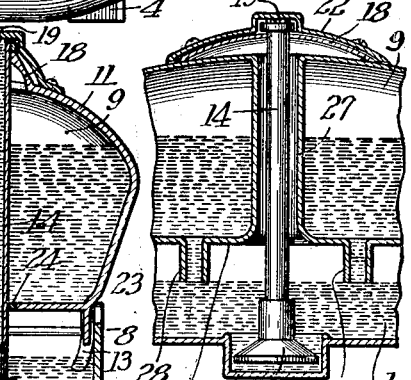
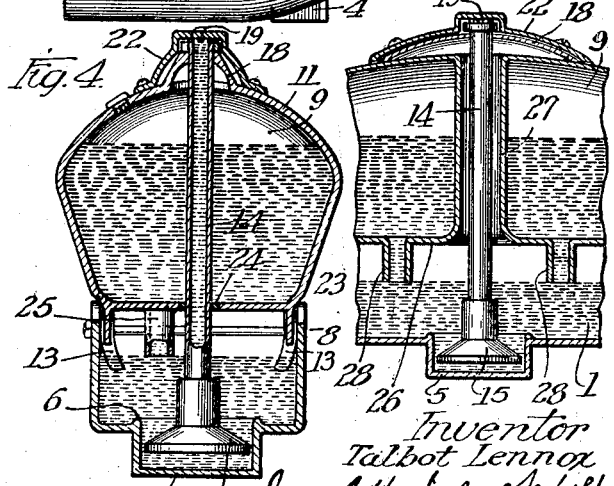
Witnesses:
Inventor
Talbot Lennox

UNITED STATES PATENT OFFICE.

TALBOT LENNOX, OF MARSHALLTOWN, IOWA.

DEVICE FOR APPLYING LIQUID INSECTICIDES TO ANIMALS.

1,211,187.  Specification of Letters Patent.  Patented Jan. 2, 1917.

Application filed April 23, 1915. Serial No. 23,432.

*To all whom it may concern:*

Be it known that I, TALBOT LENNOX, a citizen of the United States, residing at Marshalltown, in the county of Marshall and State of Iowa, have invented new and useful Improvements in Devices for Applying Liquid Insecticides to Animals, of which the following is a full, clear, concise, and exact description, reference being had to the accompanying drawing, forming a part of this specification.

My invention relates to devices for applying liquid disinfectants or insecticides to animals, preferably in the form of oil, and has for one of its objects the provision of a device against which the animal may rub for applying to himself the disinfecting oil and which is operated by the animal for causing the oil to be distributed over the surface thereof.

In the embodiment of the invention illustrated—Figure 1 is a side elevation, partly in section, of the animal-oiler; Fig. 2 is a transverse section taken on the line 2—2 of Fig. 1; Fig. 3 is a partial plan view; Fig. 4 is a sectional view showing a modification of my invention; and Fig. 5 is a partial longitudinal section of another form of my invention.

In the embodiment illustrated, I provide a trough 1, which is preferably elongated and has its end walls rounded, as at 2, and is provided at each end with integrally cast legs or supports 3, these legs or supports having at their bottoms inturned flanges 4, through which bolts may be passed for securing the device to skids. Centrally formed in the bottom of the trough is a well 5 which is formed integrally with the bottom of the trough, and surrounding the top of this well is an annular dam 6.

Mounted above the trough and rockably supported upon a pair of rods or bolts 8 extending through the side walls of the trough is an oil distributer 9. This distributer preferably takes the form of a hollow casting having a pair of flattened side walls 10 which are adapted to diverge outwardly from a narrow bottom fitting within the walls of the trough and merging into the upper rounded top surface 11. These side walls at the end also merge into tapering end walls which converge at the end into a point projecting beyond the ends of the trough, and also merge into the rounded or arc-shaped top. The side walls at their bottoms are provided with slots 12 which are lengthened by lugs 13 extending beyond the side walls and through which slots the supporting bolts 8 are adapted to pass so that the distributer may be rocked upon the bolts when pressure is applied to the side or ends, and at the same time the distributer will not be dislodged from its position on the trough.

Secured to the top of the distributer and about the center thereof is a hollow piston rod 14 which carries at its lower end a piston 15 fitting in the well 5. The lower end of this piston rod is provided with a ball check 16 and the piston rod at its upper end has a loose connection with the top of the casing. This connection is readily provided by passing the rod through an opening in the casing and screwing a nut 17 on the top of the hollow piston rod, forming a collar, to prevent the rod from dropping back through the opening. At the top of the casing is formed a distributing cap 18 which is provided with suitable grooves or channels 19. The top of the piston rod is also grooved or channeled, as at 20, so that as the oil rises and flows out over the top of the rod 14 it will be directed by these channels to various portions of the distributer, the distributer being also provided with grooves or channels 21 to aid in the distribution of the oil. This rod and cap are preferably covered by means of a cover plate 22, which fits over the rod and cap and is secured to the top of the distributer.

In operation, the animal in rubbing up against the distributer causes the same to rock on the supporting bolts, thus raising and lowering the piston in the well, causing a pumping action in said well which forces the oil up through the piston rod until it finally overflows out of the top and runs down the grooves of the distributing cap, being directed thereby to the top of the distributer, whence it flows down over the sides of the distributer and back into the trough, thoroughly covering the sides and ends of the distributer with oil to provide an oiled surface against which the animals rub and transfer the oil to their bodies.

By making the sides outwardly flaring and overhanging the trough, I provide a device which the animals may readily get in under and rub against. Also, by making the ends pointed or substantially cone-shaped, as shown, I provide portions against which the animals may readily rub for distributing oil under the jowl and behind their ears. This device is particularly adaptable for use for swine and the cone-shaped or pointed ends provide a ready means for the swine to rub their heads behind their ears and to rub their necks and jowls against. This is particularly advantageous as I have found that lice and vermin are more apt to collect at these points than at any others, and it is therefore desirable and advantageous, in a device of this character, to provide a structure wherein the swine may readily rub the oil behind their ears and under their necks.

Furthermore, by having the distributer outwardly flaring from the trough and providing the overhanging sides and ends, the danger of water collecting in the trough is reduced to the minimum. The arched top forms a water-shed, and while the oil will follow the contour of the distributer and flow back into the trough, after the surface has become thoroughly oiled the water will drip off the sides rather than follow the sides down and run into the trough, as water will not cling to an oiled surface.

In Fig. 4 I have illustrated a sectional view of a modified form of my oiling device. In this figure, the distributer is provided on its under side with a bottom 23 which completely closes the lower side of the distributer, the piston rod being adapted to be passed up therethrough by means of a liquid-tight joint 24. This bottom is also provided with a downwardly extending nozzle or pipe 25, which extends down to the point where it is desired for the normal level of the oil in the trough to be maintained. By this arrangement the distributer also provides a container, oil being poured thereinto through a suitable opening 26 in the top and a large amount of oil may be thus maintained in the device, the nozzle forming a liquid seal to prevent the oil from running out of the distributer-container and into the trough until the level of the oil in the trough falls below the bottom of the nozzle, when the oil will run out of the container-distributer until the proper level in the trough is again reached.

In Fig. 5 I have illustrated another form of my invention, operating along the same lines as that disclosed in Fig. 4. The oil distributer 9 acts as a distributer-container and is provided with a closed bottom 26 and has extending therethrough a tubular wall 27 providing an opening through the distributer-container for the hollow piston rod 14. At different points in the bottom there is formed a pair of nozzles 28 which extend downwardly from the bottom of the distributer-container to the point where it is desired for the oil level to be maintained. The distributer-container is filled with oil and the oil flows out of the nozzles until the level of the oil in the tank rises high enough to seal the bottom of the nozzles, thereby preventing a further flow of oil until the level of the oil in the tank falls below this point again.

Having thus described my invention, what I claim and desire to secure by Letters Patent, is:—

1. In a device for applying liquid insecticides to animals, the combination with a trough, of a distributer rockably mounted above said trough on a pivotal point eccentric to the center of the distributer, and means operated by the rocking of said distributer for the transferring of liquid from the said trough to the surface of the distributer.

2. In a device of the character described, the combination with a trough, of an elongated distributer rockably mounted above said trough and having its sides and ends projecting beyond the sides and ends of the trough, and means operated by the rocking of said distributer for transferring the liquid from said trough to the surface of said distributer.

3. In a device of the character described, the combination with a trough, of a distributer mounted above said trough and draining thereinto and vertically reciprocally movable with respect thereto, and a pump operated by the reciprocal movement of said distributer for transferring the liquid from said trough to the top of said distributer.

4. In a device of the character described, the combination with a trough, of a distributer rockably mounted above said trough, a piston rod loosely hung from the top of said distributer, a pump well formed in the bottom of said trough, and a piston on the end of said rod operating in said well for forcing the liquid therein up through the rod to the surface of said distributer.

5. In a device of the character described, the combination with a trough, of an elongated distributer having flat sides flaring outwardly from said trough merging into a rounded top, said sides and top merging into pointed ends projecting beyond the ends of the trough, and means for conveying the liquid in said trough to the surface of said distributer.

6. In a device of the character described, the combination with a trough having a liquid well formed in the bottom thereof and an annular dam surrounding the top of said well and projecting above the bottom of the trough, of a distributer movably mounted above said trough, and means operated by the movement of said distributer for transferring the liquid in said well to the surface of said distributer.

7. In a device of the character described, the combination with a trough, of a distributer movably mounted above said trough, a hollow pump rod having a piston at its lower end loosely hung from the top of said distributer, a distributing cap on the top of said distributer having oil channels therein leading in various directions over the top of said distributer, said piston being operated by the movement of said distributer for raising the oil from said trough through the pump rod to said distributing cap.

8. In a device of the character described, the combination with a trough of an elongated distributer rockably mounted above said trough on a pivot eccentric to the center of said distributer, and a pump operated by the rocking movement of said distributer for transferring the oil from said trough to the surface of the distributer.

9. In a device of the character described, the combination with a trough, of a distributer mounted above said trough and having a portion of its side walls within the side walls of the trough, said distributer having elongated slots formed in the lower ends of the side walls and rods passing through the side walls of the trough and through said distributers to provide supports for said distributer above the trough and means for transferring the liquid from said trough to the surface of the distributer.

10. In a device for applying liquid insecticides to animals, the combination with a trough, of a hollow distributer rockably mounted above said trough and adapted to contain a quantity of liquid and having an opening therein communicating with said trough, said opening being sealed by the liquid in said trough when the liquid is at a predetermined level, and means operated by the rocking of said distributer for transferring the liquid from said trough to the surface of the distributer.

11. In a device for applying liquid insecticides to animals, the combination with a trough having a centrally located well in the bottom thereof, of a hollow distributer adapted to contain liquid, rockably mounted above said trough and having a central passageway extending therethrough, a piston rod extending through said passageway and hung from the top of said distributer, and a piston on the end of said rod operating on the well in said trough for forcing the liquid therein up through the rod to the surface of the distributer, said distributer having openings therein communicating with the trough to permit the passage of oil in the distributer into the trough, said openings being adapted to be sealed by the liquid in the trough when said liquid attains a predetermined level.

In witness whereof, I have hereunto subscribed my name in the presence of two witnesses.

TALBOT LENNOX.

Witnesses:
DANIEL G. BECHTEL,
GERTRUDE BECHTEL.

Copies of this patent may be obtained for five cents each, by addressing the "Commissioner of Patents, Washington, D. C."